(12) United States Patent
Matsunaga

(10) Patent No.: US 9,124,042 B2
(45) Date of Patent: Sep. 1, 2015

(54) HOLDER CONNECTED TO AN OPERATION MEMBER VIA AN ELASTIC MEMBER

(71) Applicant: JAPAN AVIATION ELECTRONICS INDUSTRY, LIMITED, Shibuyaku, Tokyo (JP)

(72) Inventor: Akihiro Matsunaga, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 14/272,409

(22) Filed: May 7, 2014

(65) Prior Publication Data

US 2014/0342601 A1    Nov. 20, 2014

(30) Foreign Application Priority Data

May 15, 2013   (JP) .................................. 2013-103173

(51) Int. Cl.
*H01R 13/52* (2006.01)
*H01R 13/74* (2006.01)

(52) U.S. Cl.
CPC ............ *H01R 13/74* (2013.01); *H01R 13/5202* (2013.01)

(58) Field of Classification Search
CPC .................................................. H01R 13/5202
USPC .................................. 439/271–275, 527–567
See application file for complete search history.

(56) References Cited

U.S. PATENT DOCUMENTS

| | | | | |
|---|---|---|---|---|
| 5,879,186 | A * | 3/1999 | Harada | 439/549 |
| 7,865,210 | B2 | 1/2011 | Wang et al. | |
| 8,393,909 | B1 * | 3/2013 | Lai et al. | 439/159 |
| 2014/0295689 | A1 * | 10/2014 | Zhao et al. | 439/271 |
| 2015/0022981 | A1 * | 1/2015 | Tan et al. | 361/756 |
| 2015/0099385 | A1 * | 4/2015 | Ikeya | 439/271 |

* cited by examiner

*Primary Examiner* — Chandrika Prasad
(74) *Attorney, Agent, or Firm* — Holtz, Holtz, Goodman & Chick PC

(57) ABSTRACT

A connector device that accommodates displacement between a holder insertion slot formed in a housing and a unit accommodated in the housing, and prevents dust from entering the housing from the holder insertion slot. An operation portion is connected to an end of a holder main body via an elastic member such that the operation portion can be moved in a direction Y of inserting the holder main body into the unit (connector), a direction Z of thickness of a card held by the holder main body, and a direction X of width of the holder main body, which is orthogonal to the direction of inserting the holder main body and the direction of the thickness of the card.

15 Claims, 18 Drawing Sheets

F I G . 14
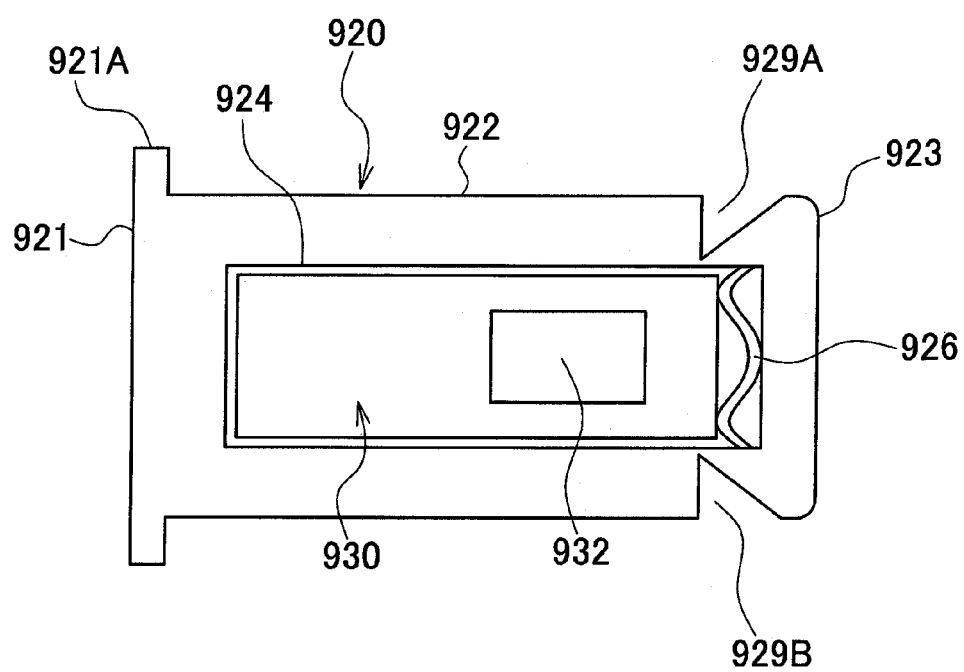

HOLDER CONNECTED TO AN OPERATION MEMBER VIA AN ELASTIC MEMBER

BACKGROUND OF THE INVENTION

1. Field of the Invention

This invention relates to a holder that holds a plate-shaped device, such as a memory card or an IC card, and a connector device that includes the holder.

2. Description of the Related Art

Conventionally, there has been known a tray 920 for holding a module 930 as a holder, as shown in FIGS. 12, 13 and 14 (see U.S. Pat. No. 7,865,210 (FIGS. 1, 2, 4, 5, 6, 9, 10, etc.)).

Note that FIGS. 12 to 18 correspond to FIGS. 1, 2, 4, 5, 6, 9 and 10 in U.S. Pat. No. 7,865,210, respectively. However, reference numerals in the drawings are changed, and some of them are omitted.

As shown in FIGS. 13 and 14, the tray 920 comprises a body portion 922, an end 921 located at one end of the body portion 922, an end 923 located at the other end of the body portion 922, a module holder 924 for holding the module 930 therein, and a retaining element 926 for retaining the module 930 held in the module holder 924. The module holder 924 is formed in the body portion 922. A through hole 927 is formed in the module holder 924.

The tray 920 is inserted into a housing 918 of a personal electronic device 910 (see FIGS. 12, 15 and 16). A circuit board 911 is housed in the housing 918, and a connector 940 is mounted on the circuit board 911 (see FIGS. 15 to 18).

The housing 918 is formed with an opening 919 via which the tray 920 is inserted into the housing 918 (see FIGS. 12, 15 and 16).

As shown in FIGS. 15 to 18, when the tray 920 is completely inserted into the housing 918 through the opening 919, the end 921 of the tray 920 is received in the opening 919. At this time, a gap between an outer peripheral surface 921A of the end 921 of the tray 920 (see FIG. 15) and an inner peripheral surface 919A of the opening 919 of the housing 918 (see FIG. 15) is small (see FIGS. 16 to 18).

As shown in FIG. 16, when the tray 920 is completely inserted into the housing 918, the tray 920 is held in a manner sandwiched between a pair of tray retainers 946A and 946B. At this time, a head 949A disposed toward a free end of an arm 948A of one tray retainer 946A is caught in one groove 929A of the tray 920, and a head 949B disposed toward a free end of an arm 948B of the other tray retainer 946B is caught in the other groove 929B of the tray 920. Further, the end 923 of the tray 920 is in contact with a detection device 944.

As shown in FIG. 18, an electronic circuitry 932 of the module 930 in the module holder 924 is electrically connected to the circuit board 911 via a coupling circuitry 917.

However, for example, if the position of the connector 940 or the circuit board 911 in the housing 918 is displaced with respect to the opening 919 of the housing 918, when the tray 920 is inserted into the housing 918 through the opening 919, the position of the connector 940 or the circuit board 911 with respect to the tray 920 is displaced in a direction 939B of width of the tray 920 (a direction orthogonal to a direction 939 of inserting the tray 920 and a direction 939A of the thickness of the tray 920), which may impair contact reliability between the module 930 and the coupling circuitry 917, thereby making it impossible to secure excellent electrical connection between the module 930 and the circuit board 911.

To avoid this problem, it is only required to make the opening 919 of the housing 918 sufficiently larger than the body portion 922 or the end 923 of the tray 920 in the direction 939B of the width of the tray 920. This accommodates displacement of the connector 940 or the circuit board 911 within the housing 918 with respect to the opening 919 of the housing 918, whereby excellent electrical connection between the module 930 and the circuit board 911 is secured.

However, if the opening 919 of the housing 918 is made larger as described above, a large gap is generated between the outer peripheral surface 921A of the end 921 of the tray 920 (see FIG. 15) and the inner peripheral surface 919A of the opening 919 of the housing 918 (see FIG. 15), and dust may enter the housing 918 from outside through the gap.

SUMMARY OF THE INVENTION

The present invention has been made in view of these circumstances, and an object thereof is to accommodate displacement between a holder insertion slot formed in a housing and a device accommodated in the housing, and prevent dust from entering the housing from the holder insertion slot.

To attain the above object, in a first aspect of the present invention, there is provided a holder that is inserted into a unit fixed in a housing through a holder insertion slot formed in the housing, comprising a holder main body for holding a plate-shaped device having at least a storage section, and an operation portion connected to an end of the holder main body and configured to be received in the holder insertion slot when the holder main body is inserted into the unit fixed in the housing, the operation portion being connected to the end of the holder main body via an elastic member such that the operation portion can be moved in at least one of a direction of inserting the holder main body into the device, a direction of thickness of the device held by the holder main body, and a direction of width of the holder main body, which is orthogonal to the direction of inserting the holder main body and the direction of the thickness of the device.

Preferably, the holder main body includes a protrusion that supports the elastic member, and the operation portion includes a surrounding portion that surrounds the elastic member.

More preferably, the elastic member has a protrusion-receiving slot formed in a central portion thereof, for receiving the protrusion, and deformability increasing portions formed in opposite ends thereof in the direction of the width of the holder main body.

Preferably, the plate-shaped device is a memory card, and the unit fixed in the housing is a connector.

Preferably, the plate-shaped device is an IC card, and the unit fixed in the housing is a connector.

Preferably, the plate-shaped device is a storage medium having a disk shape, and the unit fixed in the housing is a drive unit having at least a function of reading out information stored in the storage medium.

To attain the above object, in a second aspect of the present invention, there is provided a connector device comprising a connector fixed in a housing having a holder insertion slot formed therein, and a holder including a holder main body for holding a card, and an operation portion connected to an end of the holder main body, the holder having the holder main body inserted into the connector through the holder insertion slot of the housing, the operation portion being received in the holder insertion portion when the holder main body is inserted into the connector through the holder insertion slot, and being connected to the end of the holder main body via an elastic member such that the operation portion can be moved in at least one of a direction of inserting the holder main body into the connector, a direction of thickness of the card held by the holder main body, and a direction of width of the holder main body, which is orthogonal to the direction of inserting the holder main body and the direction of the thickness of the card.

Preferably, the holder main body includes a protrusion that supports the elastic member, and the operation portion includes a surrounding portion that surrounds the elastic member.

More preferably, the elastic member has a protrusion-receiving slot formed in a central portion thereof, for receiving the protrusion, and deformability increasing portions formed in opposite ends thereof in the direction of the width of the holder main body.

According to the present invention, it is possible to accommodate displacement between a holder insertion slot formed in a housing and a device accommodated in the housing, and prevent dust from entering the housing from the holder insertion slot.

The above and other objects, features and advantages of the present invention will become more apparent from the following detailed description taken in conjunction with the accompanying drawings.

BRIEF DESCRIPTION OF THE DRAWINGS

FIG. 8 is a perspective view showing a state in which a process of connecting the holder to the connector through the holder insertion slot of the housing is midway through;

FIG. 12 is a view showing an intermediate state in which a process of inserting a conventional tray into an opening of a housing of a personal electronic device is midway through;

FIG. 14 is a view showing a state in which a module is held in a module holder portion of the tray shown in FIG. 13;

DETAILED DESCRIPTION OF THE PREFERRED EMBODIMENTS

The present invention will now be described in detail with reference to the drawings showing preferred embodiments thereof.

Figure 1:
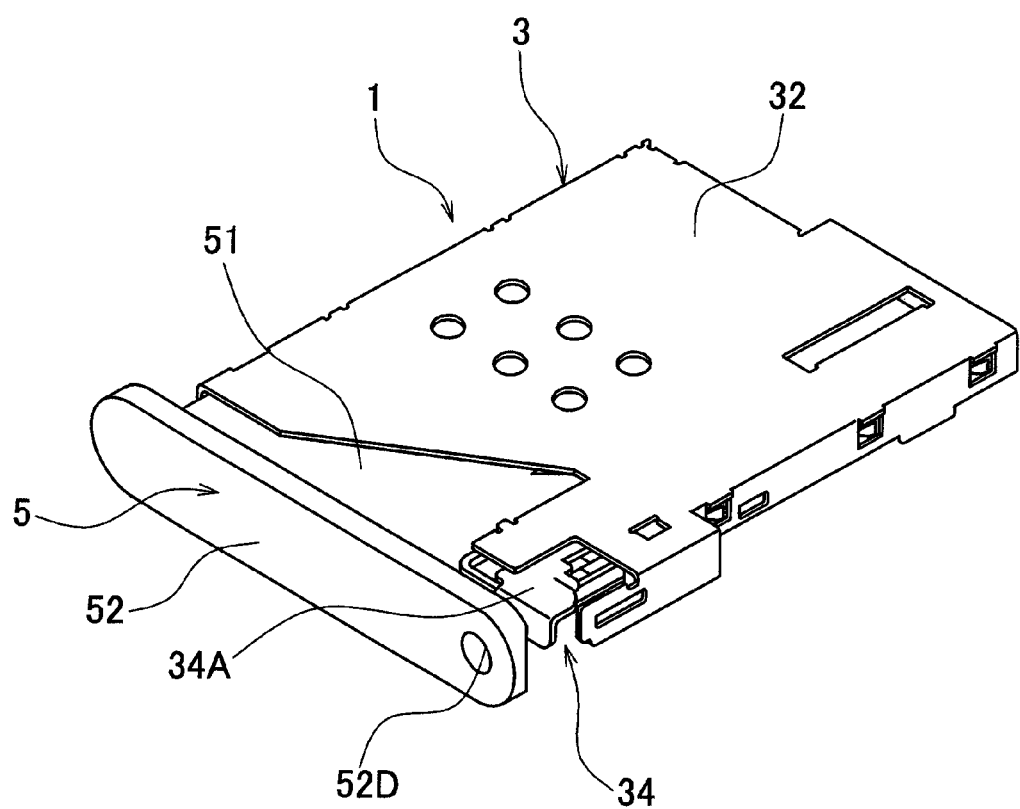
FIG. 1 is a perspective view of a connector device according to an embodiment of the present invention.

Referring to FIG. 1, a connector device 1 comprises a connector (unit) 3, and a holder 5 connected to the connector 3 in a state holding a card (plate-shaped device; see FIG. 7) 20.

Figure 7:
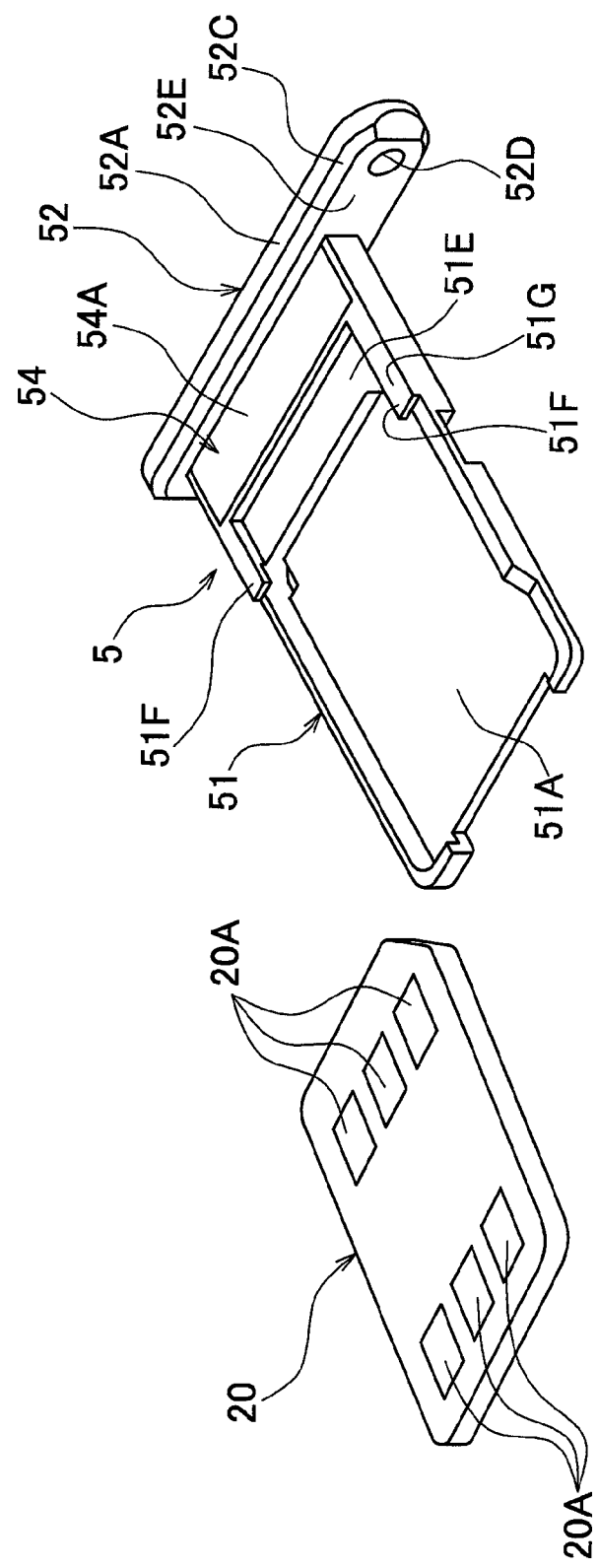
FIG. 7 is a perspective view showing a state before a card is held by the holder.
Figure 8:
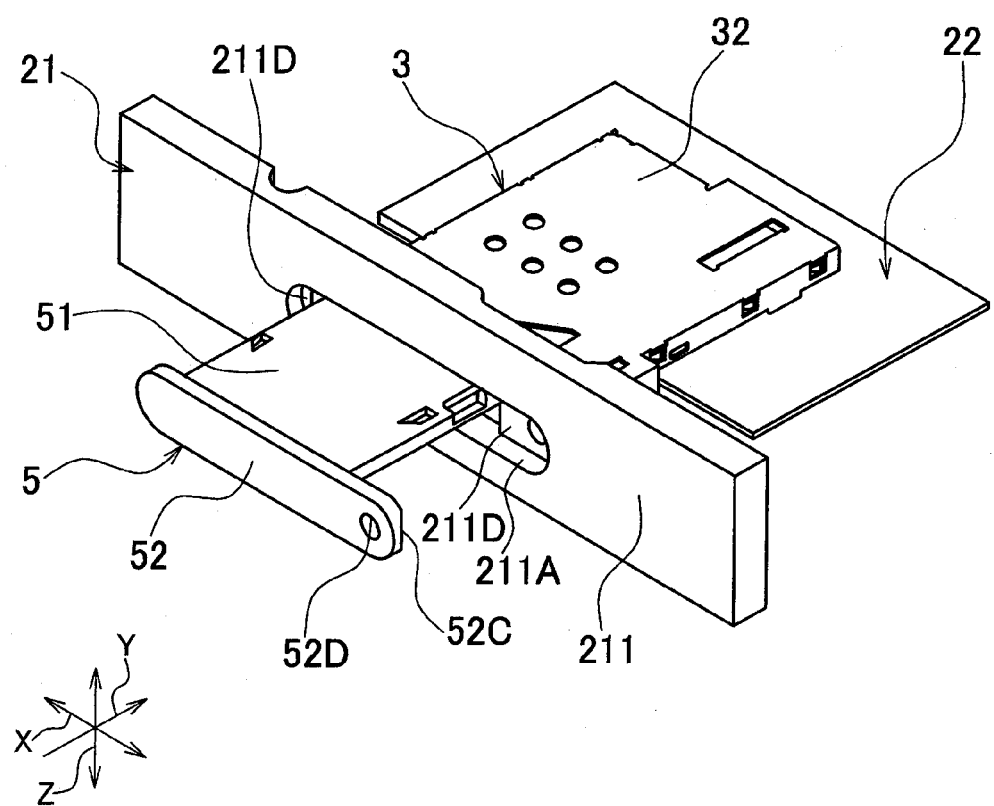

As shown in FIG. 8, the connector 3 is mounted on a printed circuit board 22 fixed within a housing 21. Note that for convenience of explanation of the present embodiment, FIG. 8 partially shows the housing 21 and the printed circuit board 22. The connector 3 electrically connects between the card 20 (see FIG. 7) held by the holder 5 and the printed circuit board 22. The card 20 includes a memory card, such as an SD (Secure Digital) card or a SIM (Subscriber Identity Module) card (of a type without an IC chip), an IC (Integrated Circuit) card, and the like.

The connector 3 includes a housing (not shown) made of a resin, a shell 32 (see FIG. 1) which is made of a metal and covers the housing, a contact (not shown) held in the housing, and an ejection mechanism 34 (see FIG. 1) for ejecting the holder 5 out of the housing 21. In the present embodiment, a known ejection mechanism is used as the ejection mechanism 34, and hence detailed description thereof is omitted.

Figure 2:
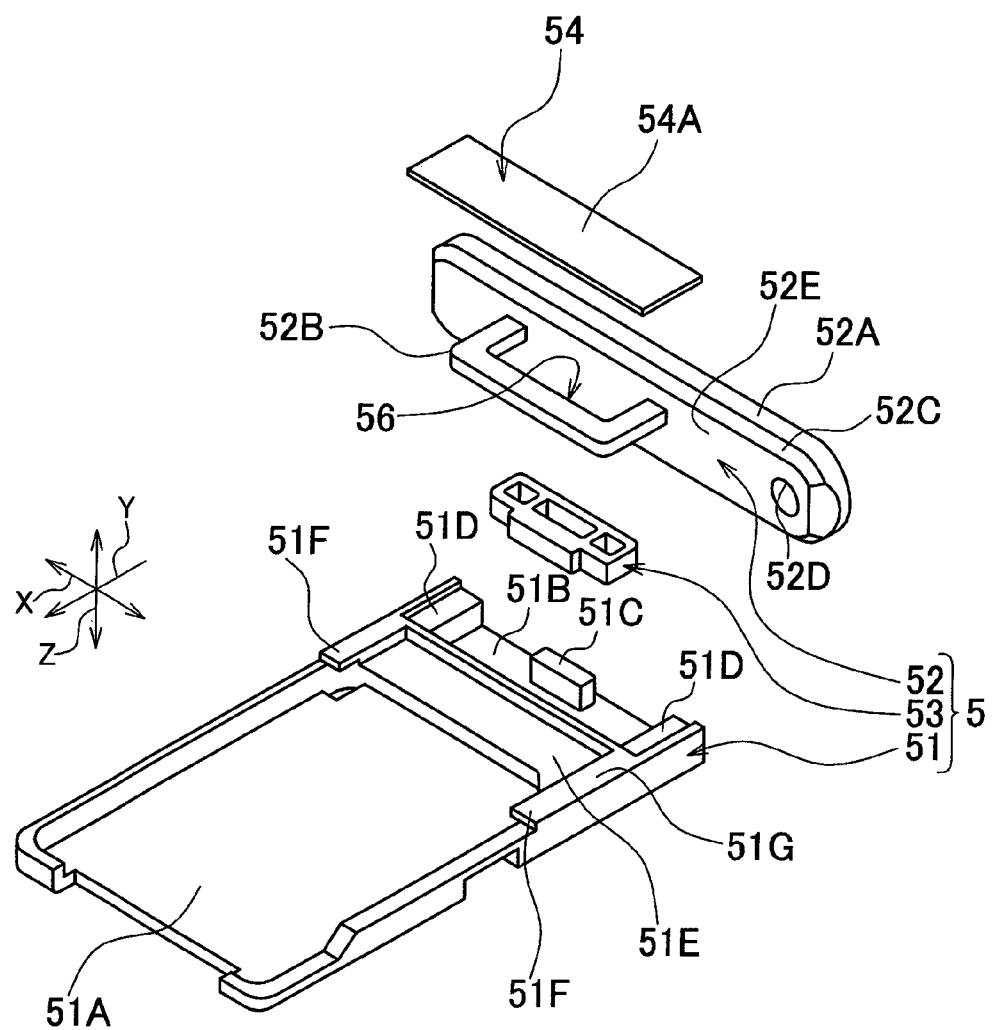
FIG. 2 is an exploded perspective view of a holder of the connector device shown in FIG. 1.
Figure 3:
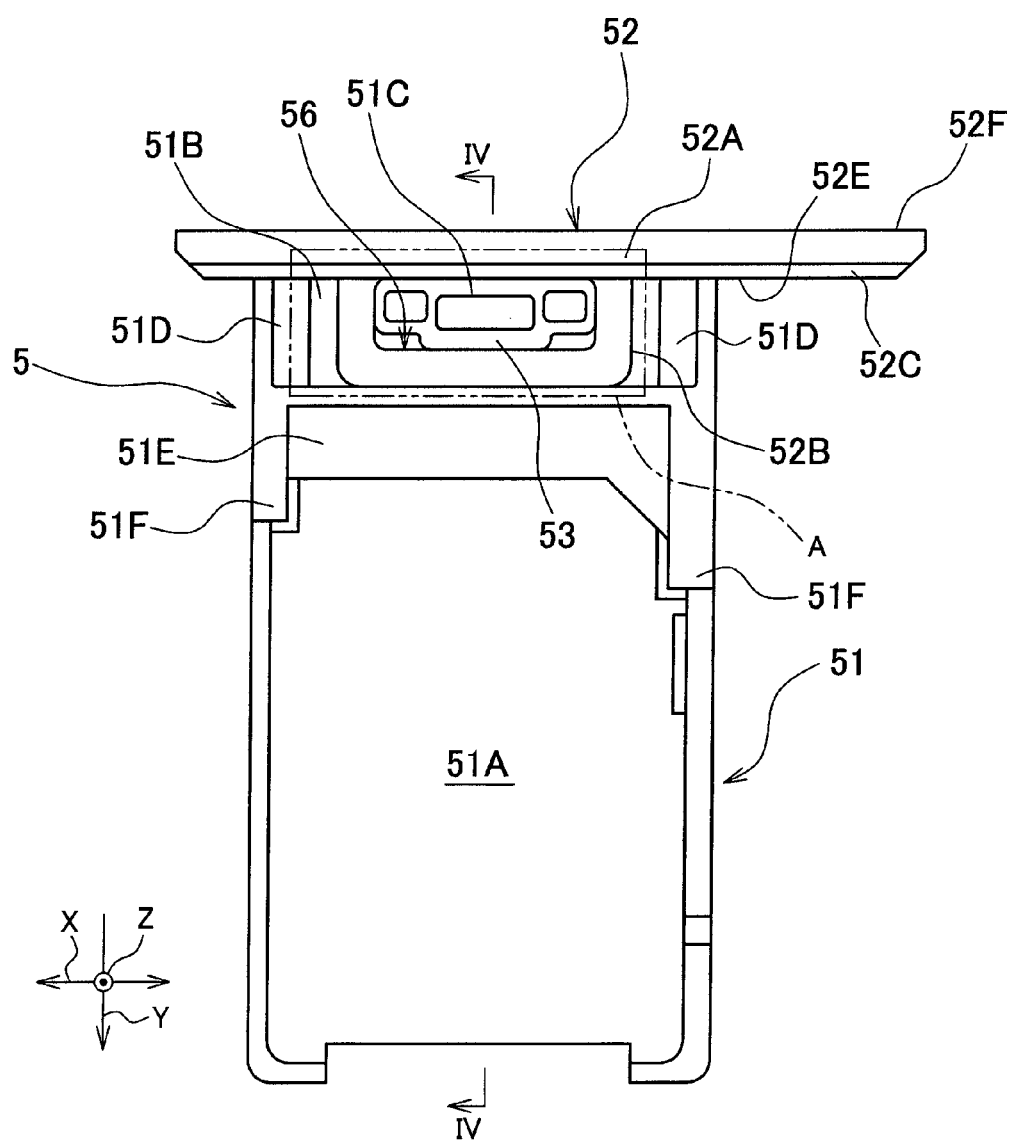
FIG. 3 is a bottom view of the holder of the connector device shown in FIG. 1.
Figure 4:
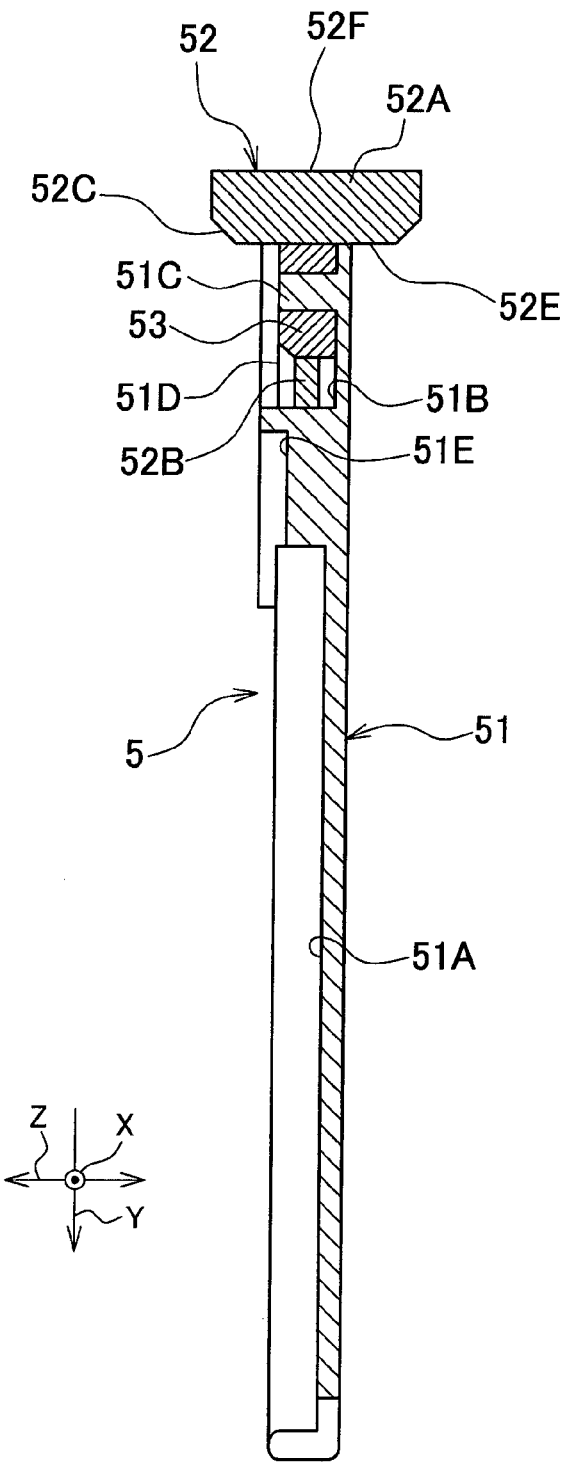
FIG. 4 is a cross-sectional view taken along IV-IV of FIG. 3.

As shown in FIGS. 2, 3 and 4, the holder 5 includes a holder main body 51 for holding the card 20 (see FIG. 7), an operation portion 52 connected to an end of the holder main body 51, and an elastic member 53 interposed between the holder main body 51 and the operation portion 52. The holder main body 51 is made of e.g. a resin. The operation portion 52 is made of e.g. an elastically deformable resin. The holder main body 51 and the operation portion 52 are coupled to each other via the elastic member 53 made of e.g. a rubber or an elastomer.

Referring to FIG. 2, the holder main body 51 has a rectangular plate-like shape. The holder main body 51 is formed with a card accommodation recess 51A in which the card 20 (see FIG. 7) is accommodated, and an accommodation recess 51B in which the elastic member 53 is accommodated. The accommodation recess 51B is located rearward of the card accommodation recess 51A (rearward of the card accommodation recess 51A in a direction Y of inserting the holder main body 51). The accommodation recess 51B of the holder main body 51 has a protrusion 51C formed on a bottom surface thereof, for holding the elastic member 53 thereon. The protrusion 51C protrudes from the bottom surface of the accommodation recess 51B in a direction Z of thickness of the card 20 held by the holder main body 51 (hereinafter referred to as the "direction Z of the thickness of the card 20"). Further, the protrusion 51C extends in a direction X of width of the holder main body 51, orthogonal to the direction Y of inserting the holder main body 51 and the direction Z of the thickness of the card 20 (hereinafter referred to as the "direction X of the width of the holder main body 51").

Further, recesses 51D are formed on opposite sides of the accommodation recess 51B (opposite sides of the accommodation recess 51B in the direction X of the width of the holder main body 51), respectively. The two recesses 51D are shallower than the accommodation recess 51B (see FIG. 4). The two recesses 51D receive opposite ends of a fixing plate 54 having a rectangular shape, referred to hereinafter, respectively.

A recess 51E for receiving part (not shown) of the housing of the connector 3 is formed between the card accommodation recess 51A and the accommodation recess 51B of the holder main body 51. The part of the housing is used for holding a fixing portion (not shown) of the contact of the connector 3 (see FIG. 1). The recess 51E is shallower than the card accommodation recess 51A and the accommodation recess 51B (see FIG. 4).

A bottom surface 51G of the holder main body 51 is formed with two protruding pieces 51F each protruding toward the card accommodation recess 51A, as shown in FIGS. 2 and 7. The protruding pieces 51F support one end of the card 20 accommodated in the card accommodation recess 51A.

The operation portion 52 includes an operation portion body 52A and a linking portion 52B, as shown in FIG. 2. The operation portion body 52A has a long plate-like shape, and a guiding surface 52C is formed on a rim of an end face 52E of the operation portion body 52A toward the holder main body 51. A hole 52D is formed in one end of the operation portion body 52A.

The linking portion 52B is substantially U-shaped, and opposite ends of the linking portion 52B are fixed to the end face 52E of the operation portion body 52A. The end face 52E of the operation portion body 52A and an inner peripheral surface of the linking portion 52B form a surrounding portion 56 which surrounds the elastic member 53 (see FIGS. 2 and 5).

Figure 11:
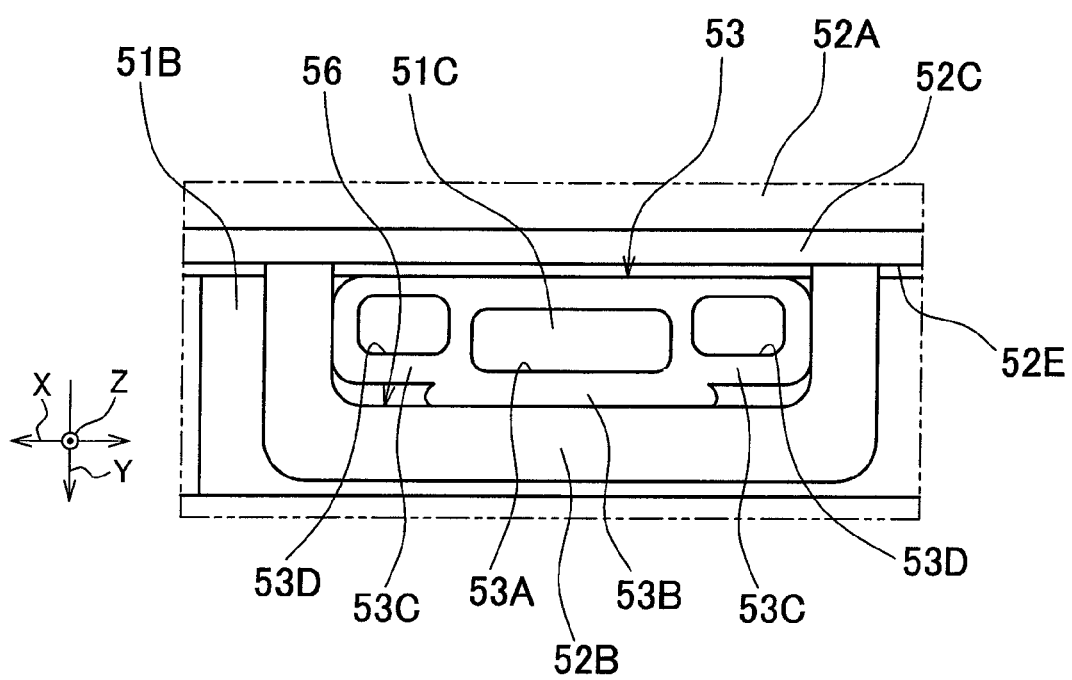
FIG. 11 is an enlarged view showing a state in which a Y-directionally compressible and deformable portion of the elastic member have been elastically deformed.
Figure 12:
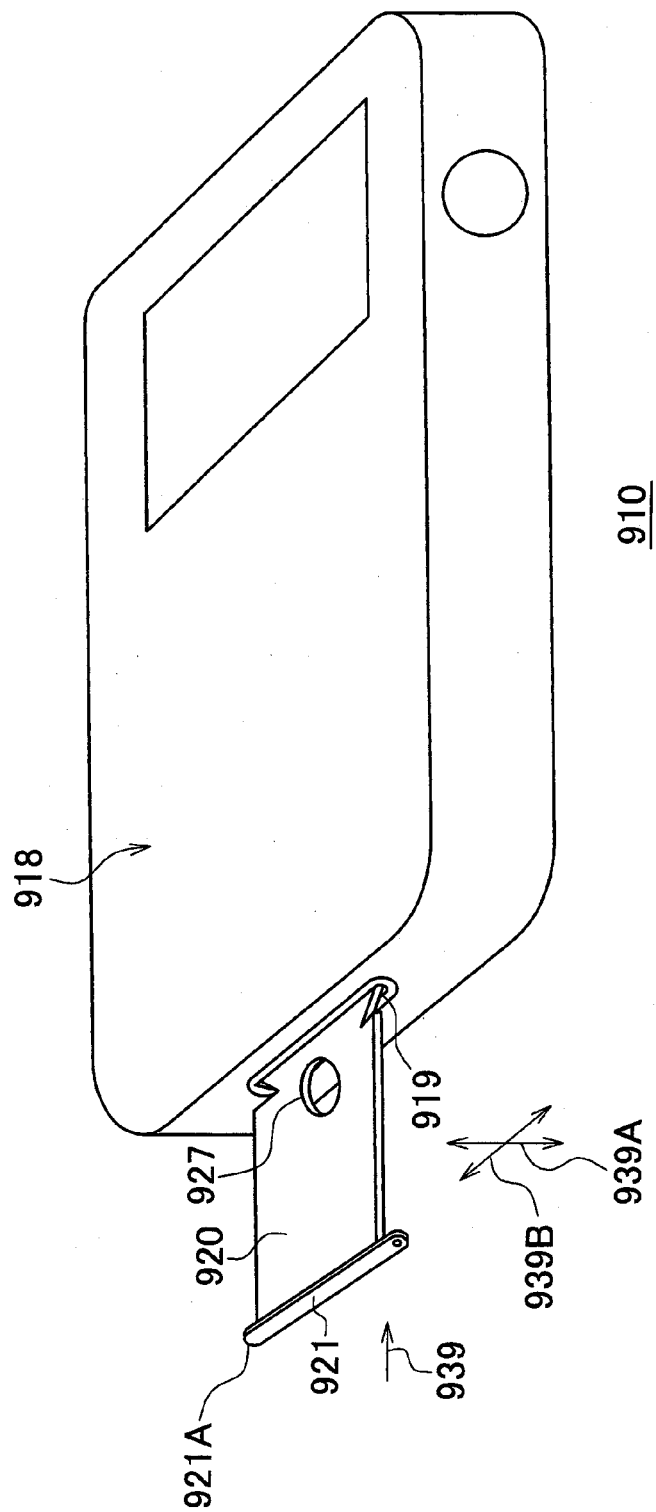
Figure 13:
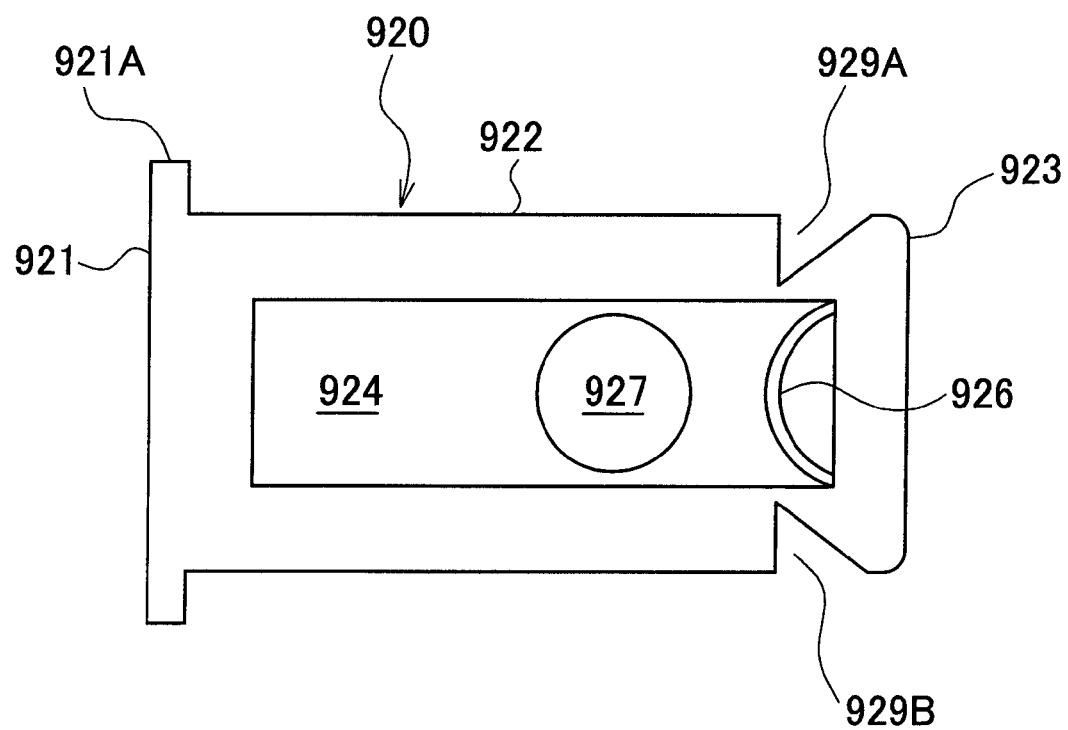
FIG. 13 is a plan view of the tray shown in FIG. 12.
Figure 15:
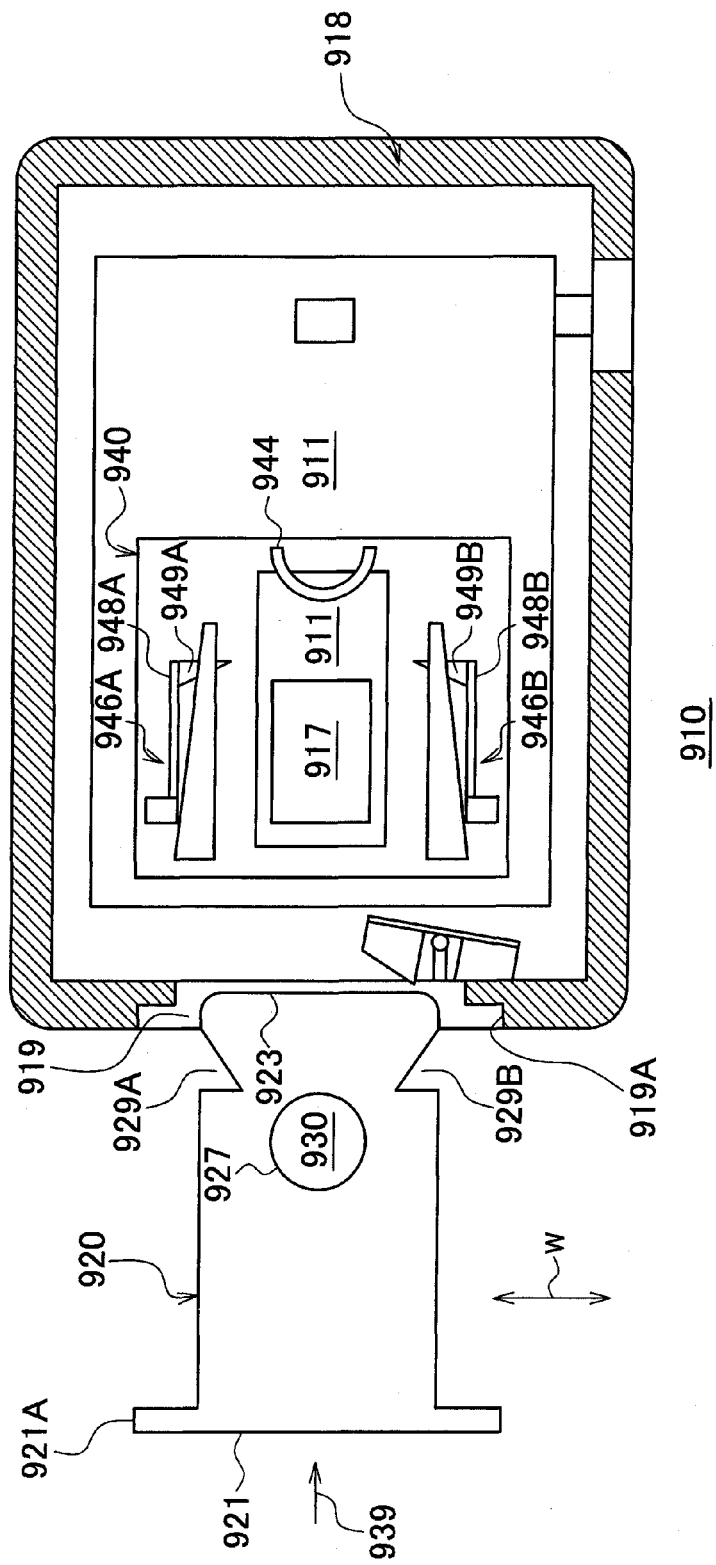
FIG. 15 is a transverse cross-sectional view of the personal electronic device shown in FIG. 12, which shows a state in which the tray has started to be inserted into the opening of the housing of the personal electronic device.
Figure 16:
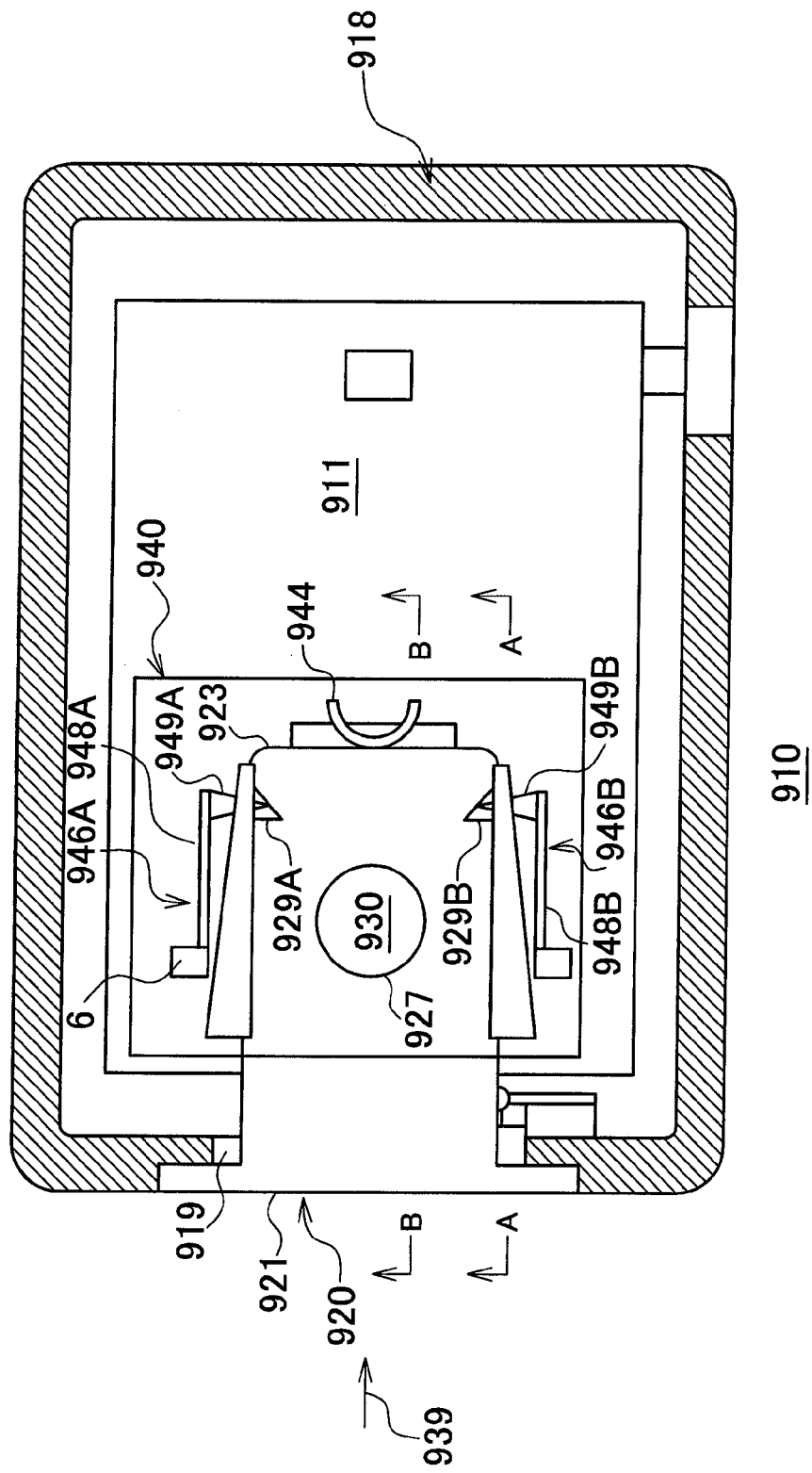
FIG. 16 is a transverse cross-sectional view of the personal electronic device shown in FIG. 12, which shows a state in which insertion of the tray into the housing through the opening of the housing of the personal electronic device has been completed.
Figure 17:
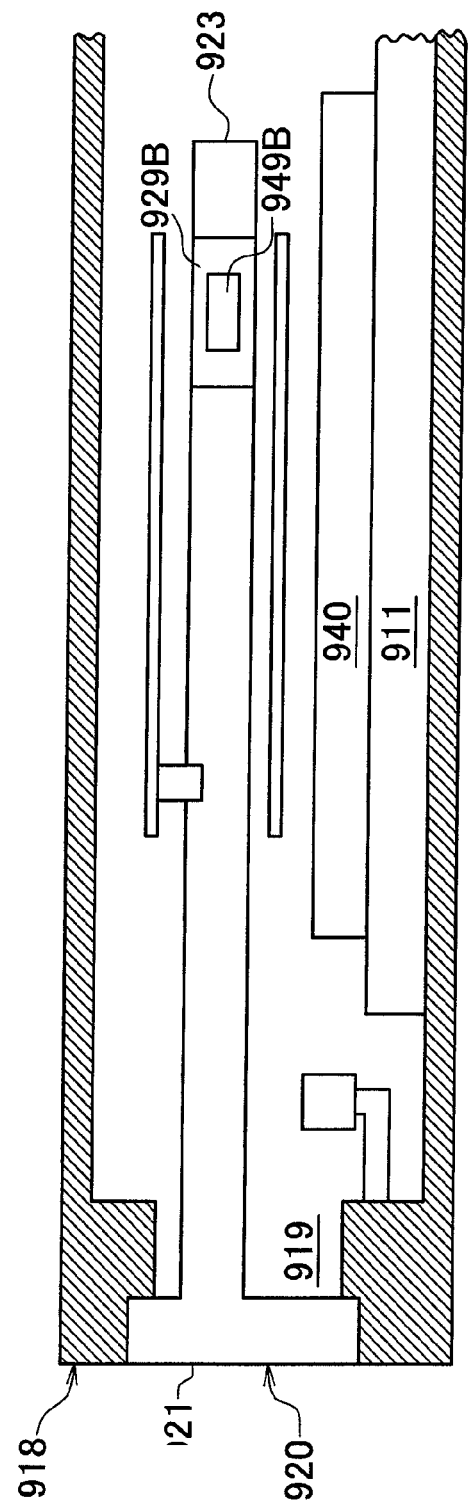
FIG. 17 is a cross-sectional view taken along A-A of FIG. 16.
Figure 18:
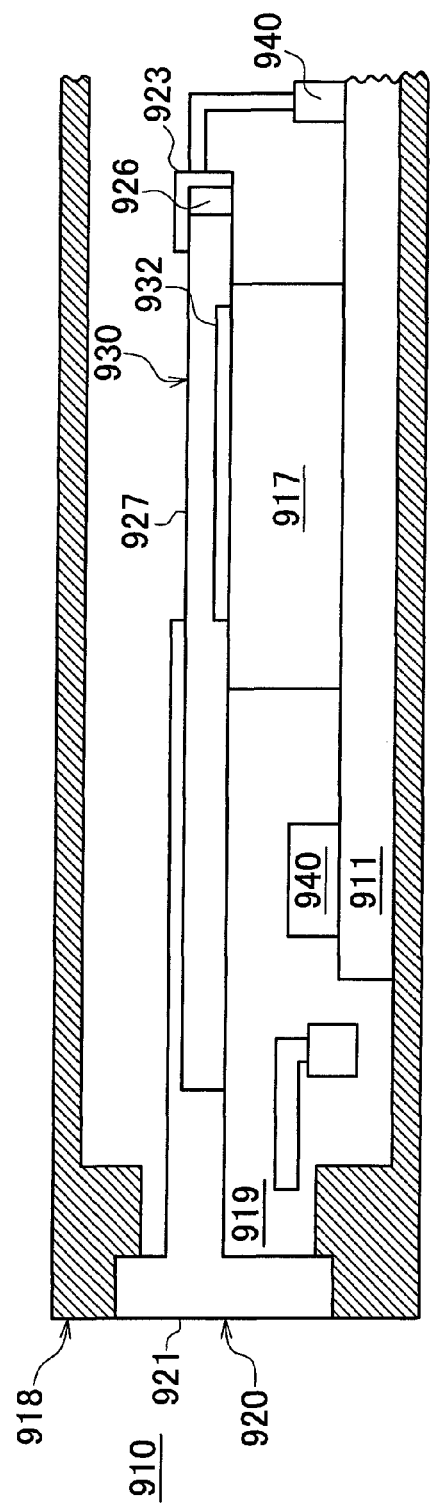
FIG. 18 is a cross-sectional view taken along B-B of FIG. 16.

As shown in FIG. 3, the length of the linking portion 52B in the direction X of the width of the holder main body 51 is shorter than the length of the accommodation recess 51B in the direction X of the width of the holder main body 51. This enables the linking portion 52B to be moved within the accommodation recess 51B in the direction X of the width of the holder main body 51. The length of the linking portion 52B in the direction Y of inserting the holder main body 51 is approximately equal to the length of the accommodation recess 51B in the direction Y of inserting the holder main body 51. Compression of a Y-directionally compressible and deformable portion 53B (see FIG. 5), referred to hereinafter, of the elastic member 53 enables the linking portion 52B to be moved within the accommodation recess 51B in the direction Y of inserting the holder main body 51 (see FIG. 11). As shown in FIG. 4, the thickness of the linking portion 52B in the direction Z of the thickness of the card 20 is smaller than the depth of the accommodation recess 51B in the direction Z of the thickness of the card 20. Therefore, the linking portion 52B can be moved within the accommodation recess 51B in the direction Z of the thickness of the card 20.

Figure 5:
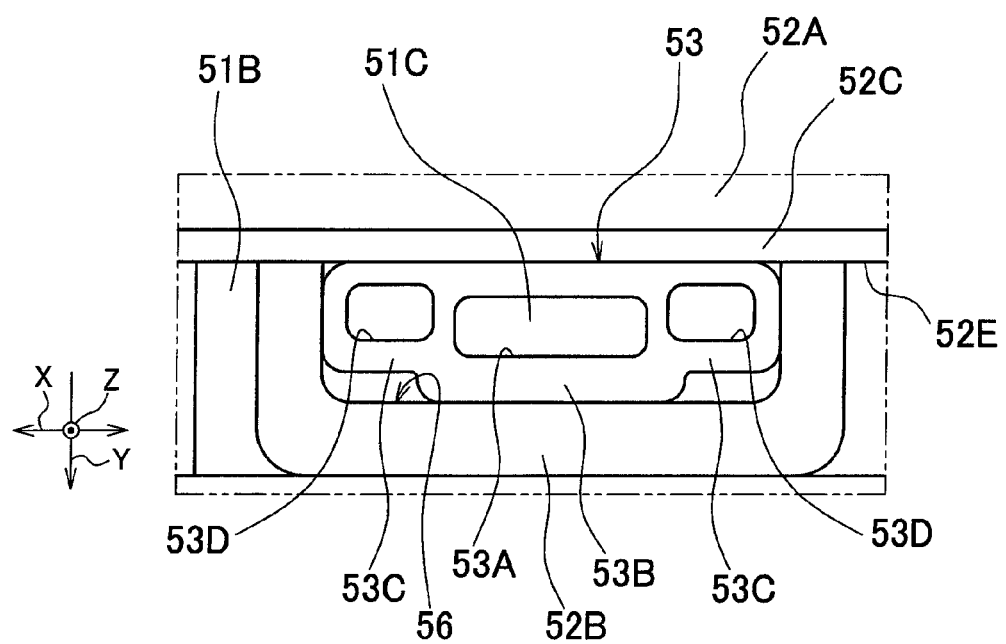
FIG. 5 is an enlarged view of a portion A in FIG. 3.

Referring to FIG. 5, a protrusion-receiving slot 53A is formed in a central portion of the elastic member 53. The protrusion-receiving slot 53A receives the protrusion 51C of the holder main body 51. The Y-directionally compressible and deformable portion 53B is formed forward of the protrusion-receiving slot 53A of the elastic member 53 in the direction Y of inserting the holder main body 51. Further, X-directionally compressible and deformable portions 53C are formed on opposite ends of the elastic member 53 in the direction X of the width of the holder main body 51, respectively. Each of the X-directionally compressible and deformable portions 53C is formed with a deformability increasing portion 53D. Each deformability increasing portion 53D is a slot-shaped portion formed for increasing elastic deformability of an associated one of the X-directionally compressible and deformable portions 53C in the direction X of the width of the holder main body 51 and increasing the amount of deformation of the same.

As shown in FIGS. 3 and 5, opposite end faces of the elastic member 53 in the direction X of the width of the holder main body 51 are in contact with an inner peripheral surface of the linking portion 52B. A front surface of the elastic member 53 in the direction Y of inserting the holder main body 51 is in contact with the inner peripheral surface of the linking portion 52B, and a rear surface of the elastic member 53 in the direction Y of inserting the holder main body 51 is in contact with the end face 52E of the operation portion body 52A. By elastically deforming the X-directionally compressible and deformable portions 53C of the elastic member 53, the operation portion 52 is moved in the direction X of the width of the holder main body 51 (see FIG. 10). By elastically deforming the Y-directionally compressible and deformable portion 53B of the elastic member 53, the operation portion 52 is moved in the direction Y of inserting the holder main body 51 (see FIG. 11).

As described above, the operation portion 52 is connected to a rear end of the holder main body 51 via the elastic member 53 such that the operation portion 52 can be moved in any one of the direction Y of inserting the holder main body 51, the direction Z of the thickness of the card 20, and the direction X of the width of the holder main body 51.

The holder 5 includes the fixing plate 54 having a rectangular shape (see FIG. 2). The opposite ends of the fixing plate 54 are received in the two recesses 51D of the holder main body 51, respectively. When the opposite ends of the fixing plate 54 are received in the two recesses 51D of the holder main body 51, respectively, the opposite ends of the fixing plate 54 are supported by bottom surfaces of the two recesses 51D of the holder main body 51, and a central portion of the fixing plate 54 is supported by the protrusion 51C. At this time, no step is formed between a surface 54A of the fixing plate 54 and the bottom surface 51G of the holder main body 51. The opposite ends of the fixing plate 54 are fixed to the bottom surfaces of the two recesses 51D of the holder main body 51, respectively, and the central portion of the fixing plate 54 is fixed to an end face of the protrusion 51C of the holder main body 51, each by laser welding. When the fixing plate 54 is fixed to the holder main body 51, the elastic member 53 is prevented from being removed from the protrusion 51C of the holder main body 51, and the linking portion 52B is prevented from being removed from the accommodation recess 51B of the holder main body 51.

Figure 6:
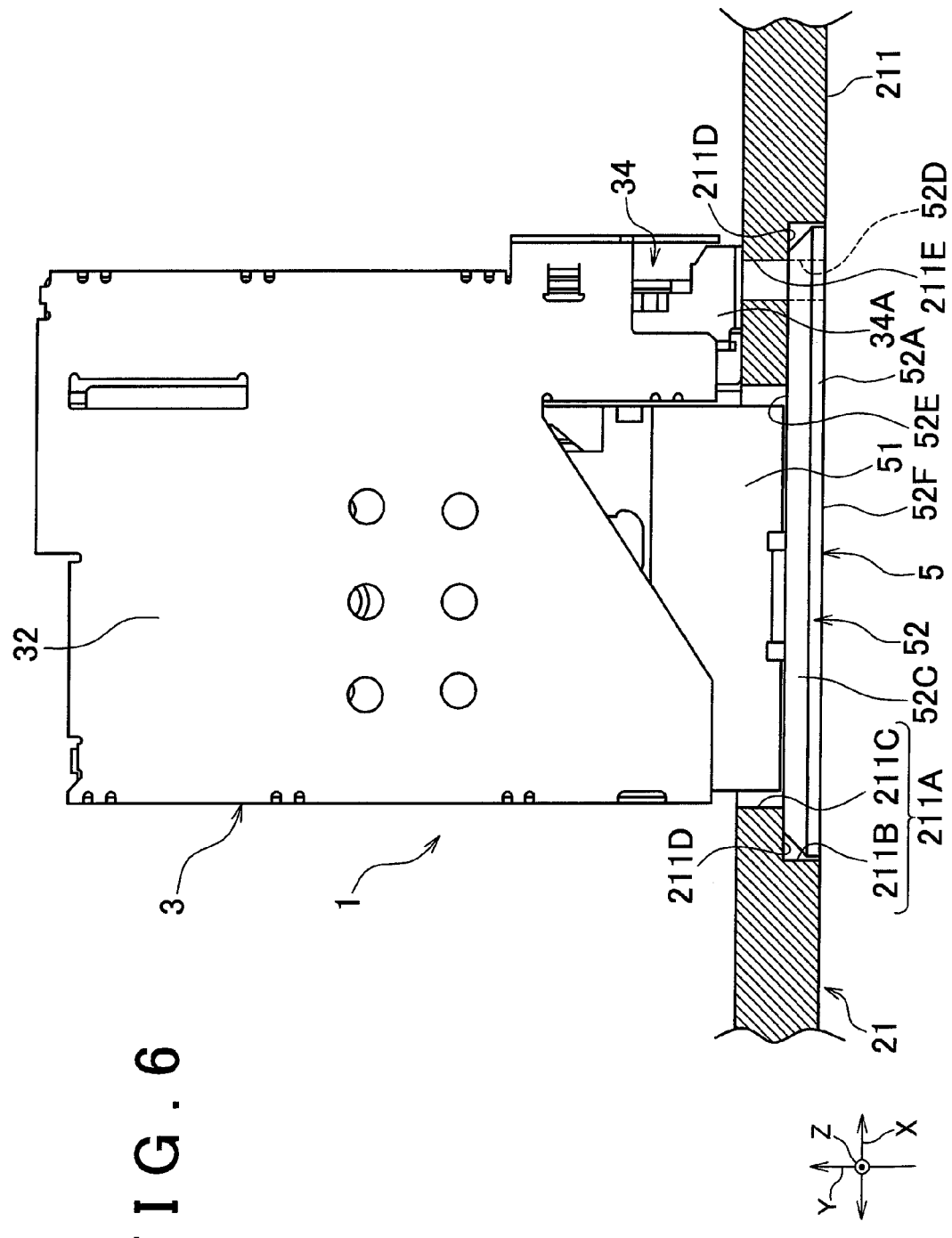
FIG. 6 is a cross-sectional view showing a state in which connection of the holder to a connector through a holder insertion slot of the housing has been completed.

As shown in FIG. 6, a holder insertion slot 211A of the housing 21 is an opening extending through the housing 21 in the direction Y of inserting the holder main body 51. The holder insertion slot 211A includes a small opening 211C through which the holder main body 51 is inserted into an opening (not shown; a portion into which the holder main body 51 is inserted) of the connector 3, and a large opening 211B for receiving the operation portion body 52A.

The length of the small opening 211C in the direction X of the width of the holder main body 51 is larger than the length of the opening of the connector 3 in the direction X of the width of the holder main body 51. The length of the small opening 211C in the direction Z of the thickness of the card 20 is larger than the length of the opening of the connector 3 in the direction Z of the thickness of the card 20.

The length of the large opening 211B in the direction X of the width of the holder main body 51 is larger than the length of the small opening 211C in the direction X of the width of the holder main body 51. The length of the large opening 211B in the direction Z of the thickness of the card 20 is equal to the length of the small opening 211C in the direction Z of the thickness of the card 20.

Since the length of the large opening 211B in the direction X of the width of the holder main body 51 is larger than the length of the small opening 211C in the direction X of the width of the holder main body 51, stepped surfaces 211D are formed on opposite sides of the small opening 211C of the housing 21, respectively (opposite sides of the small opening 211C in the direction X of the width of the holder main body 51, respectively) (see FIG. 6). The two stepped surfaces 211D support opposite ends of the end face 52E of the operation portion body 52A in the direction X of the width of the holder main body 51, respectively. A hole 211E is formed in one of the stepped surfaces 211D of the housing 21. The hole 211E and the hole 52D of the operation portion 52 are opposed to each other in the direction Y of inserting the holder main body 51 (see FIG. 6). Further, an ejection button 34A of the ejection mechanism 34 and the hole 211E are opposed to each other in the direction Y of inserting the holder main body 51 such that the ejection button 34A blocks the hole 211E from inside.

To connect the card 20 to the connector 3 within the housing 21 by using the holder 5, first, as shown in FIG. 7, the card 20 is received in the card accommodation recess 51A of the holder main body 51. An end of the card 20 received in the card accommodation recess 51A is held by the protruding pieces 51F of the holder main body 51, and hence even if the holder 5 is inverted upside down, the card 20 is prevented from being dropped from the card accommodation recess 51A of the holder main body 51.

Next, the operation portion 52 is held by the thumb and fingers such that an upper surface of the holder 5 (surface of the holder 5 in which the card accommodation recess 51A is not formed) faces upward, and as shown in FIG. 8, the holder main body 51 of the holder 5 is inserted into the connector 3 within the housing 21 through the holder insertion slot 211A of the housing 21.

Figure 9:
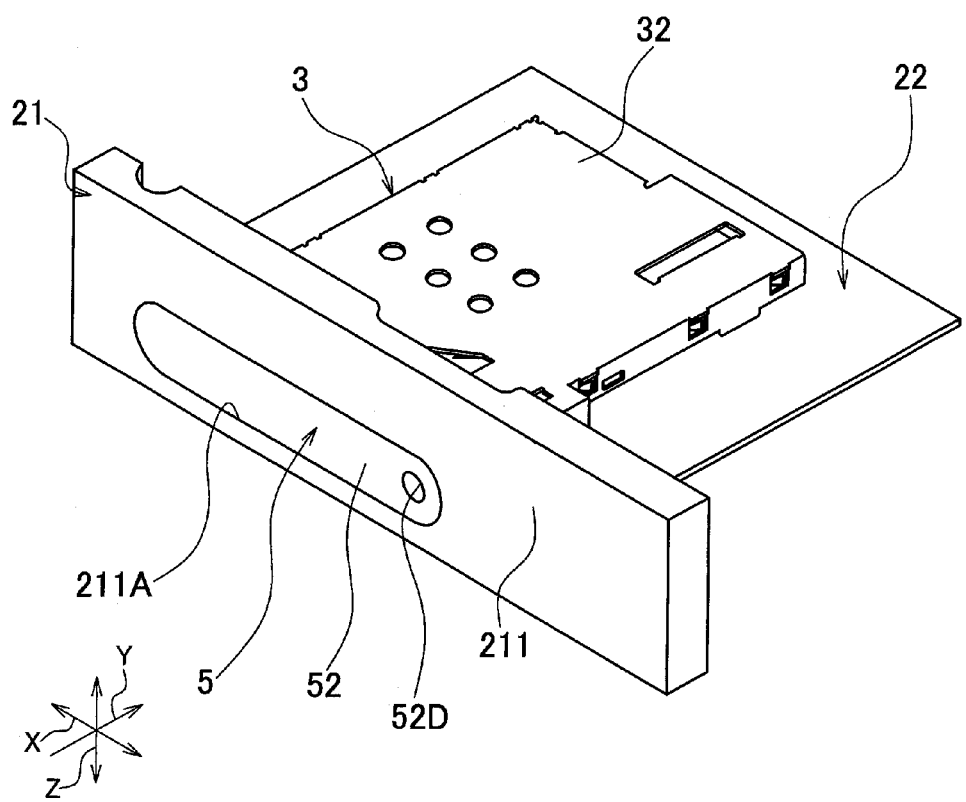
FIG. 9 is a perspective view showing a state in which the connection of the holder to the connector through the holder insertion slot of the housing has been completed.

When the holder main body 51 is inserted into the connector 3 to some extent, the thumb and fingers are once removed from the operation portion 52, and then a central portion of an end face 52F of the operation portion body 52A (a surface of the operation portion body 52A, opposite from the end face 52E) is pushed with a finger. When the position of the connector 3 is not displaced with respect to the holder insertion slot 211A, the operation portion body 52A of the operation portion 52 of the holder 5 is smoothly received in the large opening 211B of the holder insertion slot 211A, as shown in FIGS. 6 and 9. At this time, the opposite ends of the end face 52E of the operation portion body 52A are supported by the stepped surfaces 211D, and therefore when the operation portion body 52A is further pushed, the operation portion body 52A is elastically deformed into an arched shape, and the holder main body 51 is deeply inserted into the connector 3. When the holder main body 51 is inserted into the connector 3 by a predetermined amount or more, the holder main body 51 is locked to a lock portion (not shown) of the ejection mechanism 34, and is held in the connector 3.

Finally, the finger is removed from the operation portion 52. When the finger is removed from the operation portion 52, the operation portion body 52A returns to its original state by its restoring force, and the end face 52F of the operation portion body 52A and a surface 211 of the housing 21 become flat without any stepped portion therebetween. At this time, the Y-directionally compressible and deformable portion 53B of the elastic member 53 is compressed and slightly elastically deformed (see FIG. 11). This is because in the present embodiment, the connector 3 is designed to be disposed on the printed circuit board 22 such that when the holder main body 51 is completely inserted into the connector 3, the distance between the operation portion 52 and the holder main body 51 is slightly increased.

Figure 10:
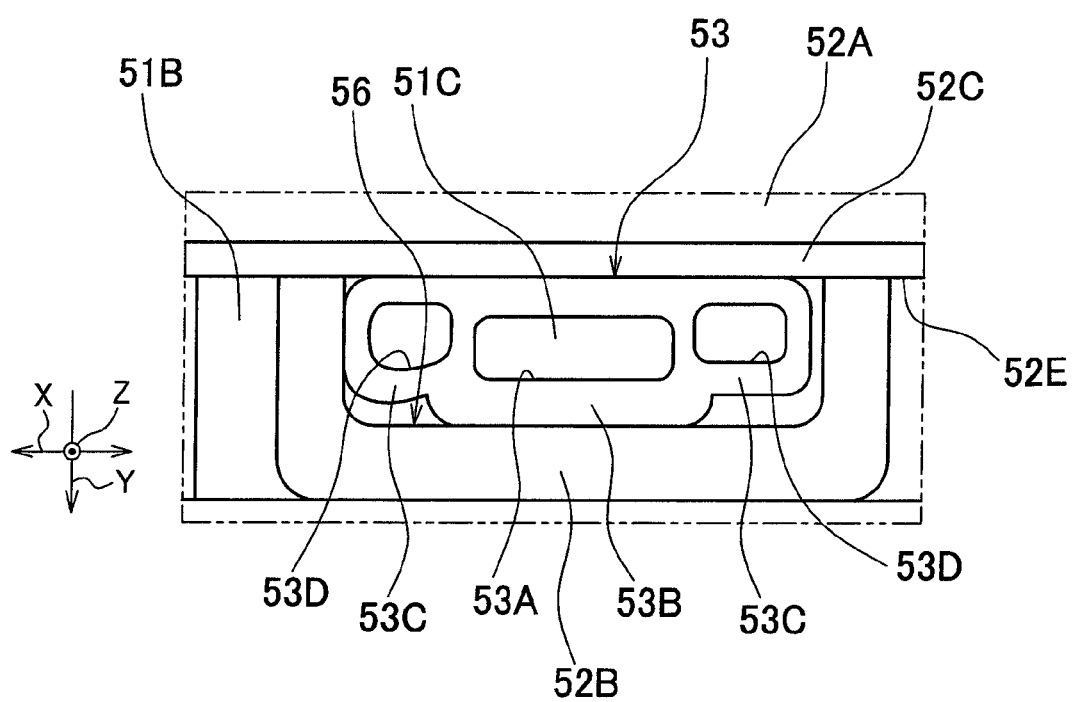
FIG. 10 is an enlarged view showing a state in which X-directionally compressible and deformable portions of an elastic member have been elastically deformed.

On the other hand, assuming that the position of the connector 3 is displaced with respect to e.g. the holder insertion slot 211A in the direction X of the width of the holder main body 51 due to some cause, such as an assembling error, since the small opening 211C of the holder insertion slot 211A is larger than the opening of the connector 3, although the holder main body 51 can be inserted into the opening of the connector 3, the position of the operation portion 52 is displaced with respect to the holder insertion slot 211A. Therefore, the guiding surface 52C of the operation portion body 52A of the operation portion 52 is brought into abutment with a rim of the large opening 211B of the holder insertion slot 211A. However, as shown in FIG. 10, one of the X-directionally compressible and deformable portions 53C of the elastic member 53 is compressed and elastically deformed, so that the operation portion 52 is moved in the direction X of the width of the holder main body 51. As a consequence, the operation portion body 52A is received in the large opening 211B of the holder insertion slot 211A, and the flat state of the end face 52F of the operation portion body 52A and the surface 211 of the housing 21 without any stepped portion therebetween is secured (see FIGS. 6 and 9).

To eject the holder 5 from the connector 3, it is only required to press the ejection button 34A of the ejection mechanism 34 by inserting a pin (not shown) into the hole 52D of the operation portion 52 and the hole 211E of the housing 21 (see FIGS. 1, 6 and 9). When the ejection button 34A is pressed by the pin, the ejection mechanism 34 ejects the holder 5 from the connector 3.

According to the present embodiment, even if the position of the connector 3 is displaced with respect to the holder insertion slot 211A of the housing 21, it is possible to insert the holder main body 51 of the holder 5 into the connector 3, and when the operation portion body 52A of the operation portion 52 of the holder 5 is received in the large opening 211B of the holder insertion slot 211A, it is possible to cover the holder insertion slot 211A such that no large gap is formed between the operation portion body 52A of the operation portion 52 and the large opening 211B of the holder insertion slot 211A. This prevents dust from entering the housing 21, makes it difficult for dust to cause contact failure between an electrode 20A of the card 20 and the contact of the connector 3, and secures excellent electrical connection between the card 20 and the connector 3 (printed circuit board 22).

Further, the holder main body 51 and the operation portion 52 of the holder 5 are connected in a manner movable in three directions using the elastic member 53 made e.g. of a rubber or an elastomer, and therefore, for example, compared with a holder (not shown) configured to connect the holder main body 51 and the operation portion 52 in a manner movable in three directions using metallic spring pieces (not shown), the holder 5 according to the present embodiment requires no large space for accommodating the metallic spring pieces, which makes it possible to reduce the size of the holder.

Furthermore, the flat state of the end face 52F of the operation portion body 52A and the surface 211 of the housing 21 without any stepped portion therebetween is secured, and no large gap is formed between the operation portion body 52A of the operation portion 52 and the large opening 211B of the holder insertion slot 211A, so that it is possible to enhance the beauty of the appearance of an electronic device.

Note that although in the above-described embodiment, the operation portion 52 is connected to the end of the holder main body 51 via the elastic member 53 such that the operation portion 52 can be moved in the three directions, i.e. the direction Y of inserting the holder main body 51, the direction Z of the thickness of the card 20, and the direction X of the width of the holder main body 51, the operation portion 52 may be connected to the end of the holder main body 51 via an elastic member (not shown) such that the operation portion 52 can be moved in at least one (or two) of the direction Y of inserting the holder main body 51, the direction Z of the thickness of the card 20, and the direction X of the width of the holder main body 51.

Further, although in the above-described embodiment, the operation portion 52 can be elastically deformed, the operation portion 52 is not necessarily required to be elastically deformable. Further, the material of the operation portion 52 is not limited to a resin, but it may be a metal.

Further, although in the above-described embodiment, the holder main body 51 is caused to support the elastic member 53 by inserting the protrusion 51C of the holder main body 51 into the protrusion-receiving slot 53A formed in the elastic member 53, the configuration in which the holder main body 51 supports the elastic member is not necessarily limited to this, but the holder main body 51 may be caused to support the elastic member e.g. by forming a protrusion (not shown) on the elastic member and inserting the protrusion into a hole (not shown) formed in the holder main body 51.

Further, although in the above-described embodiment, the connector 3 is employed as an example of a unit fixed in the housing 21, and the card 20, such as a memory card or an IC card, is employed as an example of a plate-shaped device held by the holder 5 which is connected to the connector 3, this is not limitative, but e.g. a drive unit (not shown) having at least a function of reading out information stored in a plate-shaped device may be employed as another example of the unit fixed in the housing 21, and a storage medium having a disk shape (not shown), such as a DVD (Digital Versatile Disk), may be employed as the plate-shaped device held by a holder (not shown) which is connected to the drive unit.

It is further understood by those skilled in the art that the foregoing are the preferred embodiments of the present invention, and that various changes and modification may be made thereto without departing from the spirit and scope thereof.

What is claimed is:

1. A holder that is inserted into a unit fixed in a housing through a holder insertion slot formed in the housing, comprising:
   a holder main body for holding a plate-shaped device having at least a storage section; and
   an operation portion connected to an end of said holder main body and configured to be received in the holder insertion slot when said holder main body is inserted into the unit fixed in the housing, said operation portion being connected to said end of said holder main body via an elastic member such that said operation portion can be moved in at least one of a direction of inserting said holder main body into the unit, a direction of thickness of the device held by said holder main body, and a direction of width of said holder main body, which is orthogonal to the direction of inserting said holder main body and the direction of the thickness of the device.

2. The holder according to claim 1, wherein said holder main body includes a protrusion that supports the elastic member, and
   wherein said operation portion includes a surrounding portion that surrounds the elastic member.

3. The holder according to claim 2, wherein the elastic member has a protrusion-receiving slot formed in a central portion thereof, for receiving the protrusion, and deformability increasing portions formed in opposite ends thereof in the direction of the width of said holder main body.

4. The holder according to claim 1, wherein the plate-shaped device is a memory card, and
   wherein the unit fixed in the housing is a connector.

5. The holder according to claim 2, wherein the plate-shaped device is a memory card, and
   wherein the unit fixed in the housing is a connector.

6. The holder according to claim 3, wherein the plate-shaped device is a memory card, and
   wherein the unit fixed in the housing is a connector.

7. The holder according to claim 1, wherein the plate-shaped device is an IC card, and
   wherein the unit fixed in the housing is a connector.

8. The holder according to claim 2, wherein the plate-shaped device is an IC card, and
   wherein the unit fixed in the housing is a connector.

9. The holder according to claim 3, wherein the plate-shaped device is an IC card, and
   wherein the unit fixed in the housing is a connector.

10. The holder according to claim 1, wherein the plate-shaped device is a storage medium having a disk shape, and
    wherein the unit fixed in the housing is a drive unit having at least a function of reading out information stored in the storage medium.

11. The holder according to claim 2, wherein the plate-shaped device is a storage medium having a disk shape, and
    wherein the unit fixed in the housing is a drive unit having at least a function of reading out information stored in the storage medium.

12. The holder according to claim 3, wherein the plate-shaped device is a storage medium having a disk shape, and
    wherein the unit fixed in the housing is a drive unit having at least a function of reading out information stored in the storage medium.

13. A connector device comprising:
    a connector fixed in a housing having a holder insertion slot formed therein; and
    a holder including a holder main body for holding a card, and an operation portion connected to an end of said holder main body, said holder having said holder main body inserted into said connector through the holder insertion slot of the housing, said operation portion being received in the holder insertion portion when said holder main body is inserted into said connector through the holder insertion slot, and being connected to said end of said holder main body via an elastic member such that said operation portion can be moved in at least one of a direction of inserting said holder main body into said connector, a direction of thickness of the card held by said holder main body, and a direction of width of said holder main body, which is orthogonal to the direction of inserting said holder main body and the direction of the thickness of the card.

14. The connector device according to claim 13, wherein said holder main body includes a protrusion that supports the elastic member, and
    wherein said operation portion includes a surrounding portion that surrounds the elastic member.

15. The connector device according to claim 14, wherein the elastic member has a protrusion-receiving slot formed in a central portion thereof, for receiving the protrusion, and deformability increasing portions formed in opposite ends thereof in the direction of the width of said holder main body.

* * * * *